United States Patent [19]
McDonnell et al.

[11] Patent Number: 5,314,562
[45] Date of Patent: May 24, 1994

[54] CONSUMER POLYOLEFIN PRIMER

[75] Inventors: Patrick F. McDonnell, Dublin; Gerard M. Wren, County Kildare, both of Ireland; Edward K. Welch, II, Bristol, Conn.

[73] Assignee: Loctite Corporation, Hartford, Conn.

[21] Appl. No.: 13,143

[22] Filed: Feb. 1, 1993

Related U.S. Application Data

[63] Continuation of Ser. No. 812,771, Dec. 23, 1991, abandoned, which is a continuation-in-part of Ser. No. 620,227, Nov. 29, 1990, abandoned.

[51] Int. Cl.$^5$ .................................................. C09J 5/04
[52] U.S. Cl. .................................. 156/314; 106/287.3; 106/287.11; 156/331.2
[58] Field of Search ................. 156/314, 331.2; 106/287.3, 287.11; 526/298; 564/511; 556/424

[56] References Cited

U.S. PATENT DOCUMENTS

| | | | |
|---|---|---|---|
| 2,971,864 | 2/1961 | Speier | 106/287.11 |
| 3,260,637 | 7/1966 | von Bramer | 156/314 |
| 4,718,944 | 1/1988 | Plueddemann | 106/287.11 |
| 4,869,772 | 9/1989 | McDonnell et al. | |
| 4,979,993 | 12/1990 | Okamoto et al. | |
| 5,006,743 | 11/1991 | Okamoto et al. | |
| 5,079,098 | 1/1992 | Liu | |

FOREIGN PATENT DOCUMENTS

| | | | |
|---|---|---|---|
| 0295013B1 | 12/1988 | European Pat. Off. | |
| 0476203A1 | 3/1992 | European Pat. Off. | |
| 43-5004 | 2/1968 | Japan | 156/314 |

*Primary Examiner*—John J. Gallagher
*Attorney, Agent, or Firm*—Vidas, Arret & Steinkraus

[57] ABSTRACT

A method of bonding a plastic substrate with an alpha-cyanoacrylate adhesive in which a primer comprising an ethylenediamine is used. The method is particularly suitable for use in bonding polyolefins in the consumer market.

20 Claims, No Drawings

CONSUMER POLYOLEFIN PRIMER

This application is a continuation of Ser. No. 07/812,771, filed Dec. 23, 1991, now abandoned which is a continuation-in-part of Ser. No. 07/620,227, filed Nov. 29, 1990, now abandoned.

TECHNICAL FIELD

The present invention relates to the use of a primer with adhesives, especially cyanoacrylate adhesives, to promote the bonding of plastic substrates with low surface energy, particularly polyolefins.

BACKGROUND OF THE INVENTION

1. Field of the Invention

Because of their low surface energy non-polar materials are difficult to bond, even with cyanoacrylate adhesives. Particularly difficult to bond are linear polymers of simple olefins, such as polyethylene, polypropylene, polybutene and the like, including their copolymers. Other materials which can be bonded by this invention are polyacetals, plasticized polyvinyl chloride, polyurethane, ethylene-propylene diene polymer thermoplastic rubbers based on vulcanized polyolefins and the like.

While it is well known that solutions of amines and other organic and inorganic bases will accelerate the cure of cyanoacrylate adhesives, it is surprising that the primers of this invention also confer adhesion on non-polar substrates. The curing or polymerisation of a film of cyanoacrylate, between two materials, does not necessarily result in a strong bond, particularly if the materials are non-polar, and if the polymerisation of the cyanoacrylate is excessively rapid, a very weak bond or no bond will result.

2. Description of the Related Art

Various surface treatments have been used heretofore to improve adhesion of the difficult-to-bond materials described above. These treatments include surface abrasion, corona discharge (J.C. Von der Heide & H.L. Wilson, Modern Plastics 38 9 (1961) P199), flame treatment (E.F. Buchel, British Plastics 37 (1964) p142), U.V. radiation (Practising Polymer Surface Chemistry, D. Dwight, Chemtech (March 1982) P166), plasma treatment, hot chlorinated solvents, dichromate/sulphuric acid and chlorine/U.V. radiation (D.Brewis & D.Briggs, Polymer 22 7 (1981) and references therein). All the above treatments are effective to some degree and are generally thought to work by introducing polar groups on non-polar substrates.

While the above treatments may, on occasion, improve the ability of difficult substrates to be bonded with adhesives, the treatments have the disadvantage of requiring specialized apparatus and equipment and can involve corrosive and/or hazardous materials.

Apart from the above treatments, there are examples in the prior art of the use of various accelerators or initiators of the polymerization of the cyanoacrylate monomer. The disadvantage with such accelerators or initiators is that while the speed of cure of the bond is increased, adhesion on non-polar substrates is not promoted and the resulting bond can be very weak and the adhesive can slip off the substrate.

U.S. Pat. Ser. No. 3326742 of Sheppard discloses the use of certain N-Halogenated compounds at temperatures of at least 90° C. as a surface treatment for organic high polymers to render the surface of the plastic mode adherent, so that the material can be easily and securely bonded with conventional bonding agents or adhesives. The N-Halogenated amine compounds suitable for use in this process are electro-negative organic amine compounds halogenated at the nitrogen atom with either chlorine or bromine. The halogenated amine compound may either be applied to the surface to be bonded or it may be incorporated into the adhesive.

The invention is suitable for use with polymers which are normally difficult to bond particularly polyesters, polyacetals, polycarbonates, vinyl polymers, polyolefins, various nylons, and polyurethanes. Such a surface treatment requires extremely high temperatures which makes it unsuitable for use in a consumer market; it is more appropriate in an industrial setting.

Accelerators comprising basic organic nitrogen compounds for use with cyanoacrylate adhesives for surgical use are disclosed in U.S. Pat. Ser. No. 3483870 of Coover and Fassett. The organic nitrogen compounds are beta-substituted ethyl-amines of formula:

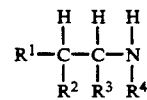

wherein $R^1$ can be alkyl or cycloalkyl of 4 to 6 carbon atoms but, preferably, is phenyl or phenyl substituted with hydroxy or lower alkoxy, or the like, $R^2$ is hydrogen, lower alkyl, preferably methyl or hydroxyl. $R^3$ and $R^4$ are hydrogen or lower alkyl; and at least one of $R^2$, $R^3$ and $R^4$ is hydroxyl or lower alkyl. These compounds are vasoconstrictors and local anesthetics; a particularly preferred compound being epinephrine.

Japanese Patent No. 74012094 of Toa Gasei Chemical Ind. discloses the use of one or more of diethyl amine, o-phenylene diamine, dimethyl-para-toluidine, diethyl-para-toluidine, N,N-diethyl aniline, trichloroacetamide and succinic acid imide to improve adhesion of alpha-cyanoacrylate type adhesives. The compounds may be used either independently or in combination or as a mixture with other amines, and are preferably used as a dilute solution with a solvent. The compounds are particularly suitable for use in bonding light metals, nylon or Delrin (polyacetal resin).

The use of alkalis to promote the adhesion of synthetic resin substances with alpha-cyanoacrylate adhesives is disclosed in Japanese Patent Publication No. 43-5004, of Toa Gosei Kagaku Kogyo Co. Ltd. inorganic or organic basic substances can be used, the most preferred being a caustic aqueous alkali solution with a density of 1 to 20%. Also disclosed are inorganic basic substances such as alkali carbonate and calcium hydroxide, or amides such as dimethyl acetoamide and formamide, amines such as monoethanal amine and ethylamine and other organic basic substances such as piperidine and pyrroline. Many of the substances disclosed in this patent application are caustic and would therefore be unsuitable for use in a consumer product.

A hardening accelerator for use with cyanoacrylate adhesives comprising an amine compound, with a boiling point of between 50° C. and 250° C., together with a deodorizer and a solvent, is disclosed in Japanese Patent Application No. 59-66471 of Toa Gosei Chemical Industry Co. Ltd. Examples of suitable amines are triethyl amine, diethyl amine, butyl amine, isopropyl amine, tributyl amine, N,N,-dimethyl aniline, N,N-diethyl aniline, N,N-dimethyl-p-toluidine, N,N-dimethyl-m-toluidine, N,N-dimethyl-o-toluidine, dimethyl benzyl amine, pyridine, picoline, vinyl pyridine, ethanolamine, propanolamine and ethylene diamine.

Japanese Patent Application No. 48-78961, also in the name of Tao Gosei Chemical Industry Co. Ltd., discloses the use of quaternary ammonium salts as adhesion promotors with inert or non-polar and/or highly crystalline plastics which are normally hard to adhere. The specification discloses a number of suitable compounds such as alkyl ammonium salts, amide-bonded amonium salts, ester-bonded ammonium salts, ether-bonded ammonium salts and alkylimidazolinium salts. The compounds also have use in promoting bonding of porous materials such as wood, leather, paper etc.

U.S. Pat. Ser. No. 3260637 of von Bramer discloses the use of a range of organic amines (excluding primary amines) as accelerators for cyanoacrylate adhesives, particularly for use on metallic and non-metallic substrates. The amines are selected from poly N-vinyl pyridine, poly(ethylenediamine) and an amine of the formulae:

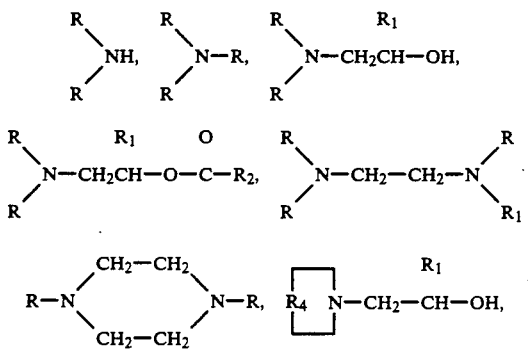

wherein R is a $C_{1-8}$ alkyl, phenyl, tolyl, xylyl, benzyl, phenylethyl, cyclopentyl or cyclohexyl radical, $R_1$ is a hydrogen atom, $C_{1-4}$ alkyl, phenyl, tolyl, xylyl, benzyl, phenylethyl, cyclopentyl or cyclohexyl radical, $R_2$ is a $C_{1-8}$ alkyl or $C_{1-8}$ alkenyl radical, $R_3$ is a hydrogen atom or a $C_{1-8}$ alkyl radical and $R_4$ is a radical —$CH_2CH_2$—O—$CH_2CH_2$—.

OBJECT OF THE INVENTION

It is an object of this invention to provide an adhesion promotor or prime substance for use in bonding plastic substrates, particularly polyolefins, to themselves or to other substrates, which is suitable for use as a consumer product. Cyanoacrylate adhesives are commonly used in the household for repairs or crafts or by the do-it-yourself enthusiast. Polyolefins are one class of plastics which are ordinarily difficult to bond using cyanoacrylate adhesives, although other plastics can be successfully bonded. However, the average consumer can not differentiate between different plastics and cannot identify polyolefins thus making the choice of a suitable adhesive for any task difficult. It is thus a further object of the invention to provide a primer which gives the greatest advantage with polyolefins and the least detrimental effect on the bond strength of other plastics.

SUMMARY OF THE INVENTION

According to the present invention there is provided a method of bonding a plastic substrate to a plastic or non-plastic substrate comprising treating the plastic surface to be bonded with a primer substance, comprising at least one adhesion-promoting ethylenediamine having he formula:

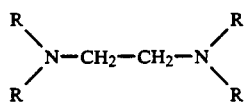

wherein each R, which may be the same or different, represents hydrogen, an alkyl, alkenyl or alkoxy group having 1 to 8 carbon atoms, an aryl group having 6 to 8 carbon atoms, a nitrogen-, sulphur-, or silicon-substituted group having 1 to 8 carbon atoms or a heterocyclic group having up to 8 carbon atoms which may be unsubstituted or substituted with hydroxy, ether oxygen or sulphur, and then applying an alpha-cyanoacrylate adhesive to the plastic substrate.

Preferred ethylenediamines are those wherein each R, which may be the same or different, represents hydrogen, an alkyl, alkenyl or alkoxy group, having 1 to 8 carbon atoms, an aryl group having 6 to 8 carbon atoms, a nitrogen- or sulphur-substituted group having 1 to 8 carbon atoms or a heterocyclic group having up to 8 carbon atoms which may be unsubstituted or substituted with hydroxy, ether oxygen or sulphur, and then applying an alpha-cyanoacrylate adhesive to the plastic substrate.

Particularly preferred ethylenediamines are those wherein at least one R is aryl, or each R is other than hydrogen and at least one R is other than methyl.

Also preferred are compounds (aminosilanes) in which at least one R group has the formula:

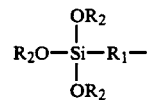

wherein $R_1$ is a branched or straight-chained aliphatic group having 3 to 8 carbon atoms and $R_2$ is a branched or straight-chained aliphatic group having 1 to 8 carbon atoms.

Particularly preferred are aminosilanes in which $R_1$ is a $C_3H_6$ group and $R_2$ is a —$CH_3$ or —$CH_2CH(C_4H_9)(C_2H_5)$ group.

Preferably the primer comprises at least one of N'-Benzyl-N,N-Dimethylethylenediamine, N-benzylethylenediamine, N,N-Diethyl-N'-Phenylethylenediamine, N,N'-Dibenzyl-N,N'-Dimethylethylenediamine, N,N'-Dibenzylethylenediamine, N,N-Diethyl-N',N'-Dimethylethylenediamine, N,N,N',N'-Tetrakis(2-Hydroxyethyl)ethylenediam N,N,N'N'-Tetrakis(2-hydroxypropyl)ethylenediamine, N,N,N',N'-Tetraallylethylenediamine, and N,N,N',N'-Tetraethylethylenediamine, N-2-aminoethyl-3-aminopropyl-tris(2-ethylhexoxy)-silane and N-[3-(trimethoxysilyl)propyl]ethylenediamine.

More preferably the primer comprises a mixture of two or more of N'-Benzyl-N,N- Dimethylethylenediamine, N-benzylethylenediamine, N,N-Diethyl- N'-Phenylethylenediamine, N,N'-Dibenzyl-N,N'-Dimethylethylenediamine, N,N'-Dibenzylethylenediamine, N,N-Diethyl-N',N'-Dimethylethylenediamine, N,N,N',N'-Tetrakis-(2-Hydroxyethyl)ethylenediamine, N,N,N'N'-Tetrakis(2-hydroxyproply)-ethylenediamine, N,N,N',N'-Tetraallylethylenediamine, N,N,N',N'-Tetraethylethylenediamine, N-2-aminoethyl-3-aminopropyl-tris(2-ethylhexoxy)-silane and N-[3-(trimethoxysilyl)propyl]-ethylenediamine.

Most preferably the primer comprises N,N,N',N'-tetraethylethylenediamine and at least one of N'-benzyl-N,N'Dimethylethylenediamine, N,N-diethyl-N'-phenylethylenediamine, N,N'-dibenzyl-N,N'-dimethylethylenediamine N-2-aminoethyl-3-aminopropyl-tris(2-ethylhexoxy)-silane.

The primer is also preferably dissolved in a solvent. Preferred solvents according to the invention are alcohols, heptanes, water, trichloroethane, acetone, freon and water/alcohol mixtures. Particularly preferred are freon, acetone and trichloroethane. The primer is preferably used at a concentration of between 0.01% and 1.5% weight/weight in solvent, preferably between 0.1% and 0.75% weight/weight in solvent.

The plastic substrate may be treated with the primer and the primer allowed to dry. Adhesive may then be applied within about 30 minutes of the primer drying.

In a further aspect the invention relates to the use of a primer as defined above to promote the bonding of plastic substrates, particularly polyolefins, by cyanoacrylate adhesives.

The invention also relates to a 2-part adhesive system comprising an alpha-cyanoacrylate adhesive and a primer as defined above.

Suitable cyanoacrylate adhesives for use with the primer of this invention are represented by the general formula

$$CH_2=C-COOR^1 \quad (IV)$$
$$\phantom{CH_2=C-}|$$
$$\phantom{CH_2=C-}CN$$

wherein $R^1$ is alkyl, alkenyl, cycloalkyl, aryl, alkoxyalkyl, aralkyl, haloalkyl or another suitable group. These groups may have between 1 and 12 carbon atoms, preferably 1 to 4 carbon atoms. The lower alkyl alpha-cyanoacrylates are preferred, and in particular methyl, ethyl, n-propyl, n-butyl, isobutyl, isopropyl, allyl, cyclohexyl, methoxyethyl or ethoxyethyl cyanoacrylates are preferred.

Many alpha-cyanoacrylates can be obtained commercially as one component instant adhesives, in which form they may be used in this invention.

While these commercially available cyanoacrylates are composed principally of alpha-cyanoacrylate monomer, the formulation may contain stabilizers, thickeners, adhesion promoters, plasticizers, dyes, heat resistant additives, impact resistance modifiers, perfumes and such like.

A diluted solution of a cyanoacrylate adhesive in a compatible solvent may also be used.

In the case where the substrates to be bonded are both non-polar or otherwise difficult to bond materials of that type, both substrates are coated with a solution of primer. This coating may suitably be applied by brush, spray or immersion of the substrate in the primer solution. If the non-polar substrate is to be be bonded to a polar or more active substrate, only the non-polar substrate needs to be coated with the primer.

In the case where the substrates to be bonded are of unknown polarity e.g. in the do-it-yourself or domestic repair of items constructed from various plastics, the primer is best applied to both substrates.

The primer of the present invention promotes strong bonds involving polyethylene, polypropylene, polyacetal and thermoplastic rubbers. It is effective in bonds involving a polyolefin and an "active" or easily bondable material. Additionally bond durability is greatly improved over existing commercially available polyolefin primers.

Following application of the primer to the substrate(s), the bond is completed using cyanoacrylate adhesive in the normal manner.

DETAILED DESCRIPTION OF THE INVENTION

Bonding tests on the primers of the present invention were carried out using various substrates, including natural polyethylene and natural polypropylene as the non-polar substrates, various solutions of the ethylenediamine compounds as the primer and various grades of cyanoacrylate adhesive commercially available from Loctite (Ireland) Limited. The bond strength of the resulting joints was determined using conventional methods, such as a tensile testing machine.

The following examples will more clearly illustrate the invention:

EXAMPLE 1

0.22 g of N,N,N'N'-tetraethlyethylenediamine was dissolved in 99.78 g of n-heptane (or commercial heptane) to form a primer solution.

Test pieces of natural polyethylene of dimensions 100 mm×25 mm and 3 mm in thickness were carefully deburred and degreased with isopropyl alcohol. The above primer solution was applied to the test pieces by brush to form a single coating. This coating was allowed to dry for 1 minute in air under unforced conditions. Two test pieces, both of which were primer coated as above, were then bonded with Loctite Superglue-3 (a cyanoacrylate adhesive manufactured by Loctite Corporation). The overlap bond area was 161 mm$^2$. The bonds were held by hand pressure for 30 seconds and then left unclamped to cure for 24 hours at a temperature of 22° C.

Test pieces of natural polypropylene of dimensions 100 mm×25 mm×3 mm were also prepared and coated with a primer solution as described above and bonded with Loctite adhesive as in the above procedure. Test pieces of polyacetal (Delrin, a Du Pont acetal resin) of dimensions 100 mm ×25 mm ×3 mm were also prepared, primed and bonded as in above procedure. Test pieces of mild steel of dimensions 100 mm×25 mm×1.6 mm were degreased with 1,1,1-trichloroethane. The test pieces were then coated with primer and bonded as in above procedure. The tensile shear bond strength was then determined on an Instron testing machine at a pulling rate of 2 mm/minute according to Test Method ASTM D1002.

As a control, the above procedure was repeated except that no primer coating was applied to the test pieces.

The results are shown in Table 1.

TABLE 1

| TENSILE SHEAR BOND STRENGTHS ON LOW ENGERY AND ACTIVE SUBSTRATES | | | | | | |
|---|---|---|---|---|---|---|
| | | | Tensile Shear Bond Strength (daNcm$^{-2}$) | | | |
| Coating | Drying Time | Run No. | PP/PP | PE/PE | PA/PA | Steel/Steel |
| Primer | 1 minute | 1 | 52 | 45 | 29 | 87 |
| " | " | 2 | 37 | 25 | 32 | 74 |
| " | " | 3 | 79 | 41 | 29 | 90 |
| Control | | 1 | 5 | 0 | 0 | 102 |

TABLE 1-continued

TENSILE SHEAR BOND STRENGTHS ON LOW ENGERY AND ACTIVE SUBSTRATES

| Coating | Drying Time | Run No. | Tensile Shear Bond Strength (daNcm$^{-2}$) | | | |
|---|---|---|---|---|---|---|
| | | | PP/PP | PE/PE | PA/PA | Steel/Steel |
| (No Primer) | | 2 | 5 | 0 | 0 | 87 |
| | | 3 | 5 | 0 | 0 | 84 |

Adhesive used above was Loctite Superglue-3 which is based on ethyl-2-cyanoacrylate and the primer was based on N,N,N',N', Tetraethylethylenediamine.
PP=Polypropylene,
PE=Polyethylene
PA=Polyacetal

EXAMPLE 2

The following primer solutions were prepared.
Primer A: 0.2 g of N'-Benzyl-N,N-Dimethylethylenediamine dissolved in 99.8 g of heptane.
Primer B: 0.2 g of N,N-Diethyl-N'-Phenylethylenediamine dissolved in 99.8 g of heptane.
Primer C: 0.2 g of N,N,N',N'-Tetrakis(2-Hydroxyethyl)ethylenediamine dissolved in a solvent mixture of 96 g heptane and 4 g isopropylalcohol.
Primer D: 0.2g of N,N,N'N'-Tetrakis(2-hydroxypropyl)ethylenediamine dissolved in a solvent mixture composed of 96 g heptane and 4 g isopropylalcohol.
Primer E: 0.2g of N,N,N',N'-Tetraallyl-ethylenediamine dissolved in 99.8 g of heptane.
Primer F: 0.2 g of N-benzylethylenediamine dissolved in 99.8 g of heptane.

Test pieces of polyethylene, polypropylene, polyacetal and steel were prepared as in Example 1. These were treated with a single coating of one of the above primers and allowed to dry in air for 1 minute. Primer was applied to both surfaces to be bonded. The primed test pieces (and unprimed controls) were bonded with Loctite Superglue-3 cyanoacrylate adhesive as in Example 1.

The results are shown in Table 2.

TABLE 2

BOND STRENGTHS ON LOW ENERGY SUBSTRATES AND ACTIVE SUBSTRATES WITH VARIOUS PRIMER SOLUTIONS

| | Run No. | Tensile Shear Bond Strength (daNcm$^{-2}$) | | | |
|---|---|---|---|---|---|
| | | PP/PP | PE/PE | PA/PA | Steel/Steel |
| Primer A | 1 | 88 | 52 | 97 | 37 |
| | 2 | 124 | 46 | 102 | 40 |
| | 3 | 105 | 45 | 51 | 12 |
| Primer B | 1 | 105 | 45 | 51 | 12 |
| | 2 | 97 | 36 | 89 | 28 |
| | 3 | 102 | 66 | 41 | 40 |
| Primer C | 1 | 32 | 29 | 103 | 16 |
| | 2 | 25 | 14 | 71 | 28 |
| | 3 | 29 | 17 | 96 | 19 |
| Primer D | 1 | 58 | 25 | 51 | 25 |
| | 2 | 91 | 24 | 50 | 0 |
| | 3 | 77 | 20 | 53 | 22 |
| Primer E | 1 | 98 | 30 | 71 | 65 |
| | 2 | 109 | 21 | 49 | 50 |
| | 3 | 105 | 9 | 24 | 74 |
| Primer F | 1 | 20 | 29 | 38 | 93 |
| | 2 | 32 | 14 | 35 | 56 |
| | 3 | 48 | 19 | 45 | 31 |
| Control | 1 | 5 | 0 | 0 | 102 |
| (No primer) | 2 | 5 | 0 | 0 | 87 |

TABLE 2-continued

BOND STRENGTHS ON LOW ENERGY SUBSTRATES AND ACTIVE SUBSTRATES WITH VARIOUS PRIMER SOLUTIONS

| Run No. | Tensile Shear Bond Strength (daNcm$^{-2}$) | | | |
|---|---|---|---|---|
| | PP/PP | PE/PE | PA/PA | Steel/Steel |
| 3 | 5 | 0 | 0 | 84 |

[Adhesive used as Loctite Superglue 3]
PP/PE/PA=Polypropylene/Polyethylene/Polyacetal

EXAMPLE 3

The following solutions were prepared as primers within the scope of the invention and comparative examples:-
Solution A1: 0.2 g of N,N'-Dibenzyl-N,N'-Dimethylethylenediamine dissolved in 99.8 g of heptane.
Solution A2: 0.2 g of N,N'-Dibenzylethylenediamine dissolved in 99.8 g of heptane.
Solution A3: 0.2 g of N,N-Diethyl-N',N'-Dimethylethylenediamine dissolved in 99.8 g of heptane.
Solution C1: 0.2 g of N,N'-Dimethylethylenediamine dissolved in 99.8 g of heptane.
Solution C2: 0.2 g of N,N-Diethylethylenediamine dissolved in 99.8 g of heptane.
Solution C3: 0.2 g of N,N'-Diisopropylethylenediamine dissolved in 99.8 g of heptane.
Solution C4: 0.2 g of N,N,N'-Triethylethylenediamine dissolved in 99.8 g of heptane.
Solution C5: 0.2 g of N,N-Dimethylethylenediamine dissolved in 99.8 g heptane.
Solution C6: 0.2 g of N,N'-Di-Tert-Butylethylenediamine dissolved in 99.8 g of heptane.
Solution C7: 0.2 g of N,N,N',N'-Tetramethylethylenediamine dissolved in 99.8 g of heptane.
Solution C8: 0.2 g of N,N,N',N'-Tetraacetylethylenediamine dissolved in a solvent mixture composed of 62 g of heptane and 38 g of acetone.
Solution C9: 0.2 g of N-Ethylethylenediamine dissolved in 99.8 g of heptane.

Test pieces of natural polyethylene and polypropylene were prepared as in Example 1. These were treated with a single coating of one of the above solutions and allowed to dry in air for 1 minute. The solution was applied to both surfaces to be bonded. The treated test pieces (and untreated controls) were bonded with Loctite Superglue-3 cyanoacrylate adhesive as in Example 1.

The results of the bond strength determinations are in Table 3.

TABLE 3

TENSILE SHEAR BOND STRENGTHS ON POLYETHYLENE AND POLYPROPYLENE

| TEST SOLUTION | Tensile Shear Bond Strength (daNcm$^{-2}$) | | | | | |
|---|---|---|---|---|---|---|
| | PP/PP | | | PE/PE | | |
| | Run 1 | Runs 2 | Run 3 | Run 1 | Run 2 | Run 3 |
| Solution A1 | 33 | 69 | 53 | 43 | 31 | 30 |
| Solution A2 | 37 | 45 | 34 | 6 | 7 | 6 |
| Solution A3 | 25 | 21 | 25 | 12 | 15 | 15 |
| Solution C1 | 0 | 7 | 10 | 6 | 7 | 5 |
| Solution C2 | 9 | 11 | 7 | 5 | 9 | 7 |
| Solution C3 | 16 | 19 | 24 | 6 | 7 | 7 |
| Solution C4 | 0 | 0 | 0 | 11 | 6 | 10 |
| Solution C5 | 0 | 0 | 0 | 0 | 0 | 0 |
| Solution C6 | 19 | 24 | 7 | 5 | 5 | 7 |
| Solution C7 | 0 | 0 | 0 | 0 | 6 | 6 |

TABLE 3-continued
TENSILE SHEAR BOND STRENGTHS ON POLYETHYLENE AND POLYPROPYLENE

| TEST | Tensile Shear Bond Strength (daNcm$^{-2}$) | | | | | |
|---|---|---|---|---|---|---|
| | PP/PP | | | PE/PE | | |
| SOLUTION | Run 1 | Runs 2 | Run 3 | Run 1 | Run 2 | Run 3 |
| Solution C8 | 0 | 0 | 0 | 0 | 0 | 0 |
| Solution C9 | 12 | 14 | 14 | 0 | 0 | 0 |
| Control (No Treatment) | 0 | 0 | 0 | 0 | 0 | 0 |

Adhesive used was Loctite Superglue-3
PE = Polyethylene
PP = Polypropylene

EXAMPLE 4

The primer solution from Example 1 was used to coat test pieces of various plastics and metals which are listed in Table 4. Prior to coating with primer, the test pieces were cleaned to remove any grease or surface contamination. The polymeric substrates were all cleaned using isopropyl-alcohol. The metallic substrates were degreased with 1,1,1-trichloroethane.

The polymeric substrates had dimensions of 100 mm × 25 mm × 3 mm. The metallic substrates had dimension of 100 mm × 25 mm × 1.6 mm.

As in Example 1, the primer was applied by brush to give one coating over the entire area to be bonded. Both substrates to be bonded were treated with primer. The primer coating was allowed to dry for 1 minute in air under unforced conditions. The test pieces, including unprimed controls, were bonded with Loctite Superglue-3 cyanoacrylate adhesive as described in Example 1.

Test results are given in Table 4.

TABLE 4
TENSILE SHEAR BOND STRENGTHS OF VARIOUS SUBSTRATES

| | Tensile Shear Bond Strength (daNcm$^{-2}$) | | | | | |
|---|---|---|---|---|---|---|
| | Primed | | | Control (unprimed) | | |
| Bond Substrates | Run 1 | Run 2 | Run 3 | Run 1 | Run 2 | Run 3 |
| Phenolic** | 19 | 60 | 48 | 57 | 61 | 61 |
| PMMA** | 74* | 9 3* | 45 | 87* | 81* | 87* |
| Aluminium** | 8 | 31 | 15 | 17 | 14 | 29 |
| PP-Steel | 47 | 31 | 43 | 6 | 6 | 9 |
| PP-PMMA | 50* | 56* | 66* | 7 | 6 | 7 |
| PP-Aluminium | 27 | 16 | 22 | 7 | 6 | 5 |
| PVC** | 105* | 92* | 109* | 114* | 124* | 118* |
| Polyester** | 68 | 76 | 67 | 82 | 82 | 90 |
| Nylon** | 114* | 89 | 104 | 115 | 152 | 112 |
| Polyurethane** | 72 | 62 | 67 | 72 | 68 | 68 |
| Polystyrene | 70 | 61 | 56 | 70 | 66 | 63 |
| PTFE** | 5 | 8 | 19 | 0 | 0 | 0 |
| Fibre Glass** | 93* | 88* | 103* | 84* | 99* | 102* |
| Epoxy Glass** | 264 | 229 | 229 | 267 | 298 | 279 |
| Cellulose Acetate** | 68 | 46 | 67 | 101 | 63 | 62 |

*Substrate Failure
**Bonded to itself, both sides primed.

Adhesive used was Loctite Superglue-3
Primer Bases on N,N,N',N'-tetraethylethylenediamine

EXAMPLE 5

The following primer solutions were prepared:
Primer B1: 1 g of N,N,N',N'-Tetraethylethylenediamine dissolved in 99.0 g of heptane.
Primer B2: 0.5 g of N,N,N',N'-Tetraethylethylenediamine dissolved in 99.5 g of heptane.
Primer B3: 0.15 g of N,N,N',N'-Tetraethylethylenediamine dissolved in 99.85 g of heptane.
Primer B4: 0.05 g of N,N,N'N'-Tetraethylethylenediamine dissolved in 99.95 g of heptane.

Test pieces of natural polypropylene were prepared as in Example 1.

These were treated with a single coating of one of the above primers and allowed to dry in air for 1 minute. Primer was applied to both surfaces to be bonded. The primed test pieces (and unprimed controls) were bonded with Loctite Superglue-3 cyanoacrylate adhesive as in Example 1.

The results are shown in Table 5.

TABLE 5

| Primer Solution | Tensile Shear Bond Strength (daNcm$^{-2}$) |
|---|---|
| Primer B1 | 77 |
| Primer B2 | 68 |
| Primer B3 | 32 |
| Primer B4 | 30 |
| Control (No Primer) | 5 |

Adhesive used above was Loctite Superglue-3

EXAMPLE 6

Primer solutions were prepared by dissolving 0.2 g of N,N,N',N'-Tetraethylenediamine in 99.9 g of the following solvents:
Primer C1 in Freon TA*
Primer C2 in Acetone
Primer C3 in 1,1,1-Trichloroethane
Primer C4 in Industrial Methylated Spirits (IMS)
Primer C5 in Isopropyl Alcohol
Primer C6 in A 9:1 mixture of IMS and water
Primer C7 in A 1:1 mixture of IMS and water
Primer C8 in Water Test pieces of natural polypropylene were prepared as in Example 1. These were treated with a single coating of one of the above primers and allowed to dry in air under unforced conditions. The times taken for the primers to dry varied with the solvent type and the nominal values are given in Table 6. After the primer had dried completely, a further 1 minute was allowed to elapse before bonding with Loctite cyanoacrylate adhesive (Superglue-3). The bonding procedure and testing were as described in Example 1.

The results are shown in Table 6.

TABLE 6

| Primer | Solvent | Drying time (s) | Tensile Shear Bond Strength (daNcm$^{-2}$) | | |
|---|---|---|---|---|---|
| | | | Run 1 | Run 2 | Run 3 |
| Primer C1 | Freon TA | 8 | 66* | 52* | 56 |
| Primer C2 | Acetone | 14 | 37 | 48* | 40 |
| Primer C3 | TCE | 24 | 50 | 99* | 102* |
| Primer C4 | IMS | 103 | 19 | 0 | 15 |
| Primer C5 | IPA | 106 | 27 | 15 | 16 |
| Primer C6 | IMS/Water (9:1) | 120 | 43 | 28 | 22 |
| Primer C7 | IMS/Water (1:1) | 720 | 12 | 57 | 26 |
| Primer C8 | Water | 2100 | 12 | 12 | 10 |

Substrate Failure

Primer solutions prepared in various solvents, all based on N,N,N',N'-Tetraethylethylene diamine and bonded with Loctite Superglue-3.

Freon TA—Trade Mark for azeotrope of acetone and 1,1,2-Trichloro-1,2,2-Trifluoroethane.
TCE—1,1,1-Trichloroethane
IMS—Industrial Methylated Spirits
IPA—Isopropylalcohol

EXAMPLE 7

Blends of various ethylenediamine derivatives together with TEEDA were then tested and compared with the performance of TEEDA alone. All formulations were in heptane.

The results are shown in Table 7.

TABLE 7

| Primer Formulation | Tensile Shear Bond Strength (daNcm$^{-2}$) | | | | |
|---|---|---|---|---|---|
| | PP | PE | PA | Phenolic | Mild Steel |
| Superglue 3 Control | 0 | 0 | 0 | 89 | 75 |
| 0.2% TEEDA | 49 | 34 | 28 | 127 | 61 |
| 0.2% BDMEDA | 106 | 51 | 97 | 11 | 49 |
| 0.05% BDMEDA | 50 | 5 | 97* | 82 | 65 |
| 0.2% TEEDA Blend 0.05% BDMEDA | 64* | 34 | 76 | 57 | 66 |
| 0.2% DPEDA | 102 | 49 | 61 | 16 | 27 |
| 0.05% DPEDA | 60 | 12 | 77 | 106 | 95 |
| 0.2% TEEDA Blend 0.05% DPEDA | 83* | 38 | 70 | 104 | 70 |
| 0.2% DBDMEDA | 53 | 35 | 7 | 5 | — |
| 0.05% DBDMEDA | 100* | 13 | 78* | 46 | 45 |
| 0.2% TEEDA Blend 0.05% DBDMEDA | 103* | 40 | 91 | 23 | 36 |
| 0.2% DBEDA | 39 | 7 | 36 | 78 | — |
| 0.05% DBEDA | 10 | 5 | 24 | 104 | 75 |
| 0.2% TEEDA Blend 0.05% DBEDA | 29 | 9 | 34 | 102 | 82 |

*Substrate Failure

TEEDA=N,N,N',N'-Tetraethylethylenediamine.
BDMEDA=N'-Benzyl-N,N-Dimethylethylenediamine.
DPEDA=N,N-Diethyl-N'-Phenylethylenediamine.
DBDMEDA=N,N'-Dibenzyl-N,N'Dimethylethylenediamine.
DBEDA=N,N'Dibenzylethylenediamine.

EXAMPLE 8

The following solutions were prepared as Primers:
Solution 1. 0.1 g of N-2-aminoethyl-3-aminopropyl-tris (2-ethylhexoxy)-silane dissolved in 99.9 g. of heptane.
Solution 2. Solution 1 with addition of 0.22 g. of N,N,N',N'-tetraethyl-ethylenediamine.
Solution 3. 0.05 g. of N-2-aminoethyl-3-aminopropyl tris (2-ethylhexoxy)-silane and 0.22 g. of N,N,N',N'-tetraethyl-ethylenediamine dissolved in 99.73 g. heptane.

Test pieces of natural polyethylene, polypropylene and polyacetal were prepared, as described in Example 1. These were treated with a single coating of one of above primer solutions and allowed to dry in air for one minute. The primer solution was applied to both surfaces to be joined. The treated test pieces were bonded with Loctite Superglue-3 cyanoacrylate adhesive, as described in Example 1. Results of tensile shear bond strength determinations are shown in Table 8.

Fixture times on polypropylene were also determined for each primer solution. The method employed was as follows:

Polypropylene bonds were prepared, as described above.

The time at which the bond was assembled was noted.

The fixture time was defined as the time taken for the bond to develop a tensile shear strength of 1.0 daNcm$^{-2}$.

Results of fixture time determinations are shown in Table 8.

TABLE 8

Tensile shear bond strengths and fixture times on polypropylene, polyethylene and polyacetal.

| Test Solution | Tensile Shear Bond Strength (daNcm$^{-2}$) | | | Fixture Time (Seconds) |
|---|---|---|---|---|
| | PP/PP | PE/PE | PA/PA | PP/PP |
| Solution 1 | 98 | 36 | 66 | 1800 |
| Solution 2 | 111 | 76 | 64 | 35 |
| Solution 3 | 118 | 88 | 58 | 30 |
| Control (No Treatment) | 0 | 0 | 0 | 1800+ |

Adhesive used was Loctite Superglue-3.
PP=Polyproylene.
PE=Polyethylene.
PA=Polyacetal.

EXAMPLE 9

Primer formulations were prepared in heptane using the following ethylenediamines:
TEEDA=N,N,N',N'-Tetraethylethylenediamine.
TMSPEDA=N-[3-trimethoxysilyl)propyl]ethylenediamine.

One coating of the primer solutions was applied to various polyolefin and non-polyolefin test pieces (lapshears). All areas to be bonded were primed. The primed lapshears were subsequently bonded with Loctite Superglue 3 liquid CA adhesive.

The bonds were cured for 24 hours at 22° C. and the tensile shear strengths determined (Table 9). All the substrates were bonded after a primer open time of 30 seconds. Additionally, some bonds were prepared after a primer open time of 24 hours.

The results (Table 9) show the silane based primer to be effective in giving strong bonds with CA adhesive on both polyolefins and non-polyolefins. Particularly good performance was achieved on polyacetal compared to the TEEDA based primer. Bond strengths on phenolic substrates were, however, significantly reduced compared to TEEDA.

TABLE 9

| Bonded Substrate | Tensile Shear Bond Strength (daNcm$^{-2}$) | |
|---|---|---|
| | 40.22% TEEDA | 0.075% TMSPEDA |
| PP-PP | 32 (0) | 53 (20) |
| PE-PE | 39 (0) | 37 (46) |
| PA-PA | 20 (13) | 100 (96) |
| PC-PC | 121 | 125 |
| Phenolic-Phenolic | 96 | 50 |
| Steel-Steel | 86 | 117 |

Adhesive: Loctite Superglue 3.
Primer Open Time: Thirty seconds. (Results in parenthesis had a primer open time of 24 hours.)
Cure Time: All bonds cured for 24 hours at room temperature before testing bond strength.
Bond Area: ½"×1" overlap.

EXAMPLE 10

Primer formulations were prepared in heptane using the following ethylenediamines:

TEEDA = N,N,N'N'-Tetraethylethylenediamine.
TMSPEDA = N-[3-(trimethoxysilyl) propyl]ethylenediamine.
BDMEDA = N'-Benzyl-N,N'-Dimethylethylenediamine.
DPEDA = N,N-Diethyl-N'-Phenylethylenediamine.
THEEDA = N,N,N',N'-Tetrakis (2-Hydroxyethyl)-ethylenediamine.
DBDMEDA = N,N'-Dibenzyl-N,N'-Dimethylethylenediamine.

The above were used alone, or as blends in the primer solutions.

Various substrates were primed and bonded with Loctite Superglue 3, as described in Example 9. Bond strength data is summarized in Table 10 and corresponding fixture times in Table 11.

The objective is to achieve the highest possible bond strengths on polyolefins (PP, PE and PA), with the minimum loss in strength on substrates (phenolic and steel). For Table 10, blend No. 4 gives the best balance across the substrate range.

Form Table 11 it is seen that a primer, based on the silane alone (reference 0.078% TMSPEDA), gives a slow fixture time of over two minutes on polypropylene when used with Superglue 3. As this is excessively long, it is likely that primers incorporating the silane would need an additional component, e.g. TEEDA to be effective.

TABLE 10

| Primer Formulation | | | Tensile Shear Bond strength (daNcm$^{-2}$) | | | | |
|---|---|---|---|---|---|---|---|
| | | | PP | PE | PA | Phenolic | Mild Steel |
| 0.172% TEEDA | ) | | | | | | |
| 0.059% THEEDA | ) | BLEND 2 | 36 | 16 | 24 | 109 | 131 |
| 0.172% TEEDA | ) | | | | | | |
| 0.055% TMSPEDA | ) | BLEND 4 | 78 | 33 | 113 | 102 | 93 |
| 0.078% TMSPEDA | | | 36 | 16 | 83 | 136 | 143 |
| 0.078% TMSPEDA | ) | | | | | | |
| 0.023% DBDMEDA | ) | BLEND 6 | 86 | 19 | 110 | 99 | 87 |
| 0.078% TMSPEDA | ) | | | | | | |
| 0.017% DPEDA | ) | BLEND 7 | 36 | 23 | 83 | 105 | 137 |
| 0.078% TMSPEDA | ) | | | | | | |
| 0.016% BDMEDA | ) | BLEND 8 | 72 | 20 | 92 | 116 | 153 |
| 0.178% BDMEDA | ) | | | | | | |
| 0.055% TMSPEDA | ) | BLEND 9 | 83 | 40 | 113 | 70 | 61 |
| No Primer (Control) | | | 0 | 0 | 0 | 87 | 125 |

TABLE 11

| Primer Formulation | | | Fixture time (Seconds) | |
|---|---|---|---|---|
| | | | PP-PP | Steel-Steel |
| 0.172% TEEDA | ) | | | |
| 0.059% THEEDA | ) | BLEND 2 | 10–20 | 5–10 |
| 0.172% TEEDA | ) | | | |
| 0.055% TMSPEDA | ) | BLEND 4 | 10–20 | 30–45 |
| 0.078% TMSPEDA | | | 120+ | 5–10 |
| 0.078% TMSPEDA | ) | | | |
| 0.023% DBDMEDA | ) | BLEND 6 | 5–10 | 5–10 |
| 0.078% TMSPEDA | ) | | | |
| 0.017% DPEDA | ) | BLEND 7 | 20–30 | 10–20 |
| 0.078% TMSPEDA | ) | | | |
| 0.016% BDMEDA | ) | BLEND 8 | 20–30 | 30–45 |
| 0.178% BDMEDA | ) | | | |
| 0.055% TMSPEDA | ) | BLEND 9 | 1–5 | 5–10 |
| No Primer (Control) | | | — | 30–45 |

All formulations in heptene. Adhesive: Loctite Superglue 3 Primer open time: 30 seconds

EXAMPLE 11

The results from Example 10 indicated that Blend No. 4 (Table 10) had good bonding performance. However, the corresponding fixture times (Table 11) for the blend were slower than expected.

Further blends were prepared, in which various levels of N'-Benzyl-N,N'-Dimethylethylenediamine were added to Blend No. 4 to give three-component formulations.

Details of the formulations, together with bond strengths (Table 12) and fixture time (Table 13) are shown below.

The Blend No. 4 formulation again gave the strongest bonds on both polyethylene and polycarbonate (Table 12) and also satisfactory fixture times (Table 13). The three-component blends did not appear to offer any additional benefits.

TABLE 12

All Primer Formulations in Heptane.
Adhesive used was Loctite Superglue 3.
Primer Open time was 30 seconds.
Primer applied to all surfaces to be bonded.

| Primer Formulation | | | Tensile Shear Bond Strength | |
|---|---|---|---|---|
| | | | PE-PE | PC-PC |
| 0.172% TEEDA | | | 40 | 112* |
| 0.172% TEEDA | ) | | | |
| 0.055% TMSPEDA | ) | BLEND 4 | 83* | 89* |
| 0.172% TEEDA | ) | | | |
| 0.055% TMSPEDA | ) | BLEND 10 | 60 | 81 |
| 0.04% BDMEDA | ) | | | |
| 0.172% TEEDA | ) | | | |
| 0.055% TMSPEDA | ) | BLEND 11 | 55 | 94 |
| 0.03% BDMEDA | ) | | | |
| 0.172% TEEDA | ) | | | |
| 0.055% TMSPEDA | ) | BLEND 12 | 74* | 83* |
| 0.02% BDMEDA | ) | | | |
| 0.172% TEEDA | ) | | | |
| 0.055% TMSPEDA | ) | BLEND 13 | 64 | 109* |
| 0.01% BDMEDA | ) | | | |
| No Primer (Control) | | | 0 | 138* |

*Substrate Failure
N.B. See notes for Example 10 for key to formulations.

TABLE 13

All primer formulations in Heptane.
Adhesive used was Loctite Superglue 3.
Primer open time was 30 seconds.
Primer applied to all surfaces to be bonded.

| Primer Formulation | | | Fixture Time (Seconds) | | |
|---|---|---|---|---|---|
| | | | PP-PP | PE-PE | PC-PC |
| 0.172% TEEDA | | | — | 1–5 | — |
| 0.172% TEEDA | ) | | | | |
| 0.055% TMSPEDA | ) | BLEND 4 | 10–20 | 1–5 | 10–20 |
| 0.172% TEEDA | ) | | | | |
| 0.055% TMSPEDA | ) | BLEND 10 | 5–10 | 1–5 | 30–60 |
| 0.04% BDMEDA | ) | | | | |
| 0.172% TEEDA | ) | | | | |

TABLE 13-continued

All primer formulations in Heptane.
Adhesive used was Loctite Superglue 3.
Primer open time was 30 seconds.
Primer applied to all surfaces to be bonded.

| Primer Formulation | | Fixture Time (Seconds) | | |
|---|---|---|---|---|
| | | PP-PP | PE-PE | PC-PC |
| 0.055% TMSPEDA ) | | | | |
| 0.03% BDMEDA ) | BLEND 11 | 5–10 | 1–5 | 30–60 |
| 0.172% TEEDA ) | | | | |
| 0.055% TMSPEDA ) | | | | |
| 0.02% BDMEDA ) | BLEND 12 | 5–10 | 1–5 | 10–20 |
| 0.172% TEEDA ) | | | | |
| 0.055% TMSPEDA ) | BLEND 13 | 5–10 | 1–5 | 10–20 |
| 0.01% BDMEDA ) | | | | |
| No Primer (Control) | | — | — | 20–30 |

N.B. See notes for Example 10 for key to formulations.

EXAMPLE 12

A selection of metal substrates were treated with primers and bonded with Loctite Superglue 3 CA adhesive.

The primer formulations were as follows. (All in heptane.):

| Primer A: | 0.22% TEEDA. | | |
|---|---|---|---|
| Primer B: | 0.078% TMSPEDA | ) | |
| | 0.016% BDMEDA | ) | Blend 7 from Example 10. |
| Primer C: | 0.22% TEEDA | ) | |
| | 0.055% TMSPEDA | ) | Similar to Blend 4 from Example 10. |

The metal substrates, which were all in the form of 4 inches × 1 inch lapshears, were cleaned by wiping with isopropanol. Both sides to be bonded were then primed and bonds prepared, as described in Example 9. Bond strength data is summarized in Table 14 and demonstrates that these particular primers do not have an adverse effect on metal bonding. While primers are not generally necessary or recommended when bonding metals with cyanoacrylate adhesives, it is important that their inadvertent use by a consumer should not lead to weak bonds.

TABLE 14

Bonding of metal substrates before and after priming.
Adhesive: Loctite Superglue 3.

| Substrate | Tensile Shear Bond Strength (daNcm$^{-2}$) | | | |
|---|---|---|---|---|
| | Primer A | Primer B | Primer C | Unprimed Control |
| Aluminium | 27 | 26 | 31 | 34 |
| Anodized aluminium | 27 | 29 | 33 | 30 |
| Mild steel | 105 | 85 | 110 | 105 |
| Stainless steel | 69 | 84 | 89 | 78 |
| Painted steel | 128 | 146 | 211 | 118 |
| Zinc bichromate | 24 | 41 | 52 | 43 |

Notes
1. Bonds tested after 24 hours cure at room temperature.
2. Bond area was 1 inch × ¼ inch.
3. Primer C equivalent to Blend 4 from Example 10.
4. See notes under Example 10 for key to above formulations.

We claim:

1. A method of bonding a pair of substrates at least one of which is a plastic substrate, the method comprising:

applying to said plastic substrate a primer solution comprising between 0.01 and 0.75% of an adhesion-promoting ethylenediamine primer substance selected from the group consisting of (a) first ethylenediamine compounds having the formula:

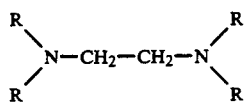

wherein each R, which may be the same or different, is hydrogen, an alkyl, alkenyl or alkoxy group having 1 to 8 carbon atoms, an aryl group having 6 to 8 carbon atoms, a nitrogen-or sulphur-substituted group having 1 to 8 carbon atoms or a heterocyclic group having up to 8 carbon atoms which may be unsubstituted or substituted with hydroxy, ether oxygen or sulphur, (b) mixtures of said first ethylenediamine compounds, and (c) mixtures of a first said ethylenediamine compound and a second ethylenediamine compound of the formula:

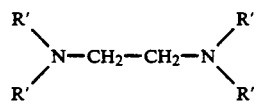

wherein at least one R' group has the formula:

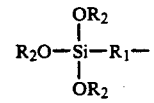

wherein $R_1$ is a branched or straight-chained aliphatic group having 3 to 8 carbon atoms, $R_2$, is a branched or straight-chained aliphatic group having 1 to 8 carbon atoms, and the remaining R' groups are defined as for R, dissolved in a solvent;

allowing the primer solution to dry;

applying an alpha-cyanoacrylate adhesive to one of said substrates; and, joining the substrates.

2. A method as claimed in claim 1 wherein the first ethylenediamine compounds are selected from the group consisting of ethylenediamines in which at least one R is aryl and ethylenediamines in which each R is other than hydrogen and at least one R is other than methyl.

3. A method as claimed in claim 1 wherein the primer substance is selected from the group consisting of any one of N'-benzyl-N,N-dimethylethylenediamine, N-benzylethylenediamine, N,N-diethyl-N'-phenylethylenediamine, N,N'-dibenzyl-N,N'dimethylethylenediamine, N,N'-dibenzylethylenediamine, N,N-diethyl-N',N'-dimethylethylenediamine, N,N,N',N'-tetrakis(2-hydroxyethyl)ethylenediamine, N,N,N'N'-tetrakis(2-hydroxypropyl)ethylenediamine, N,N,N',N'-tetraallylethylenediamine and N,N,N',N'-tetraethylethylenediamine.

4. A method as claimed in claim 1 wherein the primer comprises N,N,N',N'-tetraethylethylenediamine and one or more of N'-Benzyl-N,N'-Dimethylethylenediamine, N,N-Diethyl-N'-Phenylethylene-diamine, N,N'-Dibenzyl-N,N'-Dimethylethylenediamine and N-2-aminoethyl-3-aminopropyl-tris(2-ehtylhexoxy)-silane.

5. A method as claimed in claim 1 wherein the solvent is selected from the group consisting of alcohols, heptanes, water, trichloroethane, acetone, freon, and water-/alcohol mixtures.

6. A method as claimed in claim 1 wherein the plastic substrate is a polyolefin.

7. A method as claimed in claim 1 wherein the plastic substrate is a low surface energy non-polar material.

8. A method as claimed in claim 1 wherein the plastic substrate is a material of unknown polarity.

9. A method as in claim 1 wherein the plastic substrate is a linear polymer or copolymer of ethylene, propylene or butene, a polyacetal, a plasticized polyvinyl chloride, a polyurethane, an ethylene-propylene diene polymer or a thermoplastic rubber based on a vulcanized polyolefin.

10. A method as in claim 1 wherein said primer solution is applied to both said substrates and allowed to dry prior to joining the substrates.

11. A method as in claim 1 wherein the primer comprises a mixture of a first ethylenediamine selected from the group consisting of N,N,N',N'-tetraethylethylenediamine and N',-benzyl-N,N-dimethylethylenediamine with a second ethylenediamine compound as defined in claim 1, wherein at least one R group has the formula:

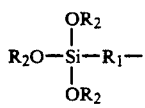

wherein R$_1$ is a branched or straight-chained aliphatic group having 3 to 8 carbon atoms and R$_2$ is a branched or straight-chained aliphatic group having 1 to 8 carbon atoms.

12. A method as in claim 1 wherein said primer substance is present in said primer solution at a level of between 0.1 and 0.75%.

13. A two-part adhesive system comprising an alpha-cyanoacrylate adhesive and a primer solution comprising between 0.01 and 0.75% of an adhesion-promoting ethylenediamine primer substance selected from the group consisting of (a) first ethylenediamine compounds having the formula:

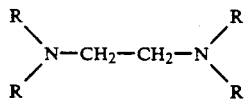

wherein each R, which may be the same or different, is hydrogen, an alkyl, alkenyl or alkoxy group having 1 to 8 carbon atoms, an aryl group having 6 to 8 carbon atoms, a nitrogen-or sulphur-substituted group having 1 to 8 carbon atoms or a heterocyclic group having up to 8 carbon atoms which may be unsubstituted or substituted with hydroxy, ether oxygen or sulphur, (b) mixtures of said first ethylenediamine compounds, and (c) mixtures of a first said ethylenediamine compound and a second ethylenediamine compound of the formula:

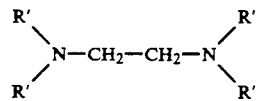

wherein at least one R' group has the formula:

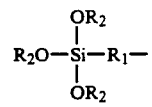

wherein R$_1$ is a branched or straight-chained aliphatic group having 3 to 8 carbon atoms, R$_2$ is a branched or straight-chained aliphatic group having 1 to 8 carbon atoms, and the remaining R' groups are defined as for R, dissolved in a solvent.

14. A two-part adhesive system as claimed in claim 13 wherein the primer comprises N,N,N',N'-tetraethylethylenediamine and at least one of N'-benzyl-N,N'Dimethylethylenediamine, N,N-diethyl-N'-phenylethylenediamine, N,N'-dibenzyl-N,N'- dimethylethylenediamine and N-2-aminoethyl-3-aminopropyl-tris(2-ethylhexoxy)-silane.

15. An adhesive system as in claim 13 wherein said primer substance is present in said primer solution at a level between 0.1 and 0.75%.

16. An adhesive system as in claim 13 wherein said solvent is selected from the group consisting of alcohols, heptanes, water, trichloroethane, acetone, freon and water/alcohol mixtures.

17. A primer composition for the promotion of bonding of a first plastic substrate to a second substrate, the composition comprising a 0.01–0.75% solution in an organic solvent of a primer substance selected from the group consisting of (a) first ethylenediamine compounds having the formula:

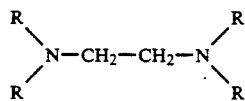

wherein each R, which may be the same or different, is hydrogen, an alkyl, alkenyl or alkoxy group having 1 to 8 carbon atoms, an aryl group having 6 to 8 carbon atoms, a nitrogen-or sulphur-substituted group having 1 to 8 carbon atoms or a heterocyclic group having up to 8 carbon atoms which may be unsubstituted or substituted with hydroxy, ether oxygen or sulphur, (b) mixtures of said first ethylenediamine compounds, and (c) mixtures of a first said ethylenediamine compound and a second ethylenediamine compound of the formula:

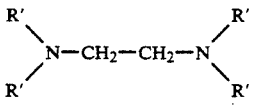

wherein at least one R' group has the formula:

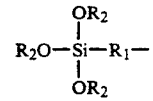

wherein R$_1$ is a branched or straight-chained aliphatic group having 3 to 8 carbon atoms, R$_2$ is a branched or straight-chained aliphatic group having 1 to 8 carbon atoms, and the remaining R' groups are defined as for R.

18. A primer composition as in claim 17 wherein said primer substance comprises N,N,N',N'-tetraethylethylenediamine.

19. A primer composition as in claim 17 wherein said primer substance comprises said compound in which at least one R is aryl.

20. A primer composition as in claim 17 wherein said the solvent is an azeotrope of acetone and 1,1,2-trichloro-1,2,2-trifluoroethane.

* * * * *